(12) United States Patent
Meling et al.

(10) Patent No.: US 12,135,723 B2
(45) Date of Patent: Nov. 5, 2024

(54) LEVERAGING INTERLINKING BETWEEN INFORMATION RESOURCES TO DETERMINE SHARED KNOWLEDGE

(71) Applicant: Microsoft Technology Licensing, LLC, Redmond, WA (US)

(72) Inventors: Jon Meling, Tromsø (NO); Jan-Ove Karlberg, Tromsø (NO); Tor Kreutzer, Tromsø (NO); Vegar S Wang, Tromsø (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 248 days.

(21) Appl. No.: 16/917,192

(22) Filed: Jun. 30, 2020

(65) Prior Publication Data
US 2021/0406270 A1    Dec. 30, 2021

(51) Int. Cl.
*G06F 16/2457*  (2019.01)
*G06F 16/248*   (2019.01)

(52) U.S. Cl.
CPC ...... *G06F 16/24578* (2019.01); *G06F 16/248* (2019.01)

(58) Field of Classification Search
CPC .................. G06F 16/24578; G06F 16/248
See application file for complete search history.

(56) References Cited

U.S. PATENT DOCUMENTS

| | | | | |
|---|---|---|---|---|
| 7,844,592 B2* | 11/2010 | Shoval | ................. | G06F 16/337 707/726 |
| 8,204,902 B1* | 6/2012 | Dhall | ................. | G06F 16/24578 707/723 |
| 8,255,380 B2* | 8/2012 | Christensen | ....... | G06Q 30/0201 707/706 |
| 8,452,769 B2* | 5/2013 | Altaf | ..................... | G06F 16/332 707/736 |
| 8,606,792 B1* | 12/2013 | Jackson | ................ | G06F 16/335 707/748 |
| 8,627,210 B2* | 1/2014 | Vijayakumar | .......... | H04L 51/52 715/753 |
| 8,818,917 B2* | 8/2014 | Flinn | .................. | G06Q 30/0631 706/11 |

(Continued)

OTHER PUBLICATIONS

"International Search Report and Written Opinion Issued in PCT Application No. PCT/US2021/029267", Mailed Date: Jul. 5, 2021, 8 Pages.

*Primary Examiner* — Miranda Le

(57) ABSTRACT

Examples of the present disclosure describe systems and methods for leveraging interlinking between resources to determine shared knowledge. In aspects, user interaction with one or more applications or services may be detected. User input associated with the user interaction may be processed to identify information, such as one or more content items, content topics, or entities. The identified information may be used to search one or more data sources for relationships between the identified information and content items, topics, and/or entities stored by the data sources. The results of the search may be collected and/or evaluated to identify the knowledge level of one or more entities with one or more topics. Based on the evaluation, an indication of the identified knowledge level(s) may be provided.

20 Claims, 10 Drawing Sheets

(56) References Cited

U.S. PATENT DOCUMENTS

| | | | |
|---|---|---|---|
| 8,954,431 B2* | 2/2015 | Okazaki | G06F 3/04815 |
| | | | 709/204 |
| 8,983,970 B1* | 3/2015 | Osinga | G06F 16/93 |
| | | | 707/748 |
| 9,218,344 B2* | 12/2015 | Al-Kofahi | G06F 16/00 |
| 9,501,539 B2* | 11/2016 | Joshi | G06F 16/254 |
| 9,600,769 B1* | 3/2017 | Liu | H04L 51/02 |
| 2009/0077062 A1* | 3/2009 | Spivack | G06F 40/30 |
| | | | 707/999.005 |
| 2009/0077124 A1* | 3/2009 | Spivack | G06F 16/25 |
| 2010/0205541 A1* | 8/2010 | Rapaport | G06Q 10/10 |
| | | | 715/753 |
| 2013/0117383 A1 | 5/2013 | Hymel | |
| 2013/0318447 A1 | 11/2013 | Deluca et al. | |
| 2014/0108325 A1* | 4/2014 | Flinn | G06N 5/048 |
| | | | 706/52 |
| 2014/0304249 A1 | 10/2014 | Ayzenshtat et al. | |
| 2015/0039655 A1* | 2/2015 | Spivack | G06Q 30/02 |
| | | | 707/803 |
| 2016/0103932 A1* | 4/2016 | Sathish | G06F 3/04847 |
| | | | 715/767 |
| 2016/0162792 A1* | 6/2016 | Lu | G06N 5/04 |
| | | | 706/46 |
| 2018/0053430 A1* | 2/2018 | Dzuban | G09B 5/06 |
| 2018/0176318 A1* | 6/2018 | Rathod | H04L 67/306 |
| 2019/0138575 A1* | 5/2019 | Toba | G06Q 30/02 |
| 2020/0074335 A1* | 3/2020 | Flinn | H04L 51/216 |

* cited by examiner

LEVERAGING INTERLINKING BETWEEN INFORMATION RESOURCES TO DETERMINE SHARED KNOWLEDGE

BACKGROUND

In many organizations and groups, especially large organizations and groups, it is common for members to have different areas of expertise. To capitalize on these various areas of expertise, many organizations and groups utilize cross-disciplinary collaboration. Although cross-disciplinary collaboration facilitates knowledge dissemination, refinement of best practices, and improvement of products/services, it also introduces new communication challenges. For example, members of different groups often possess different levels of knowledge for many knowledge areas. As a result, discussions between the members of the different groups regarding various topics may be suboptimal due to gaps in knowledge, presumptions of knowledge, and/or inadequate preparation.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for leveraging interlinking between resources to determine shared knowledge. In aspects, user interaction with one or more applications or services may be detected. User input associated with the user interaction may be processed to identify information, such as one or more content items, content topics, or entities. The identified information may be used to search one or more data sources for relationships between the identified information and content items, topics, and/or entities stored by the data sources. The results of the search may be collected and/or evaluated to identify the knowledge level of one or more entities with one or more topics. Based on the evaluation, an indication of the identified knowledge level(s) may be provided.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
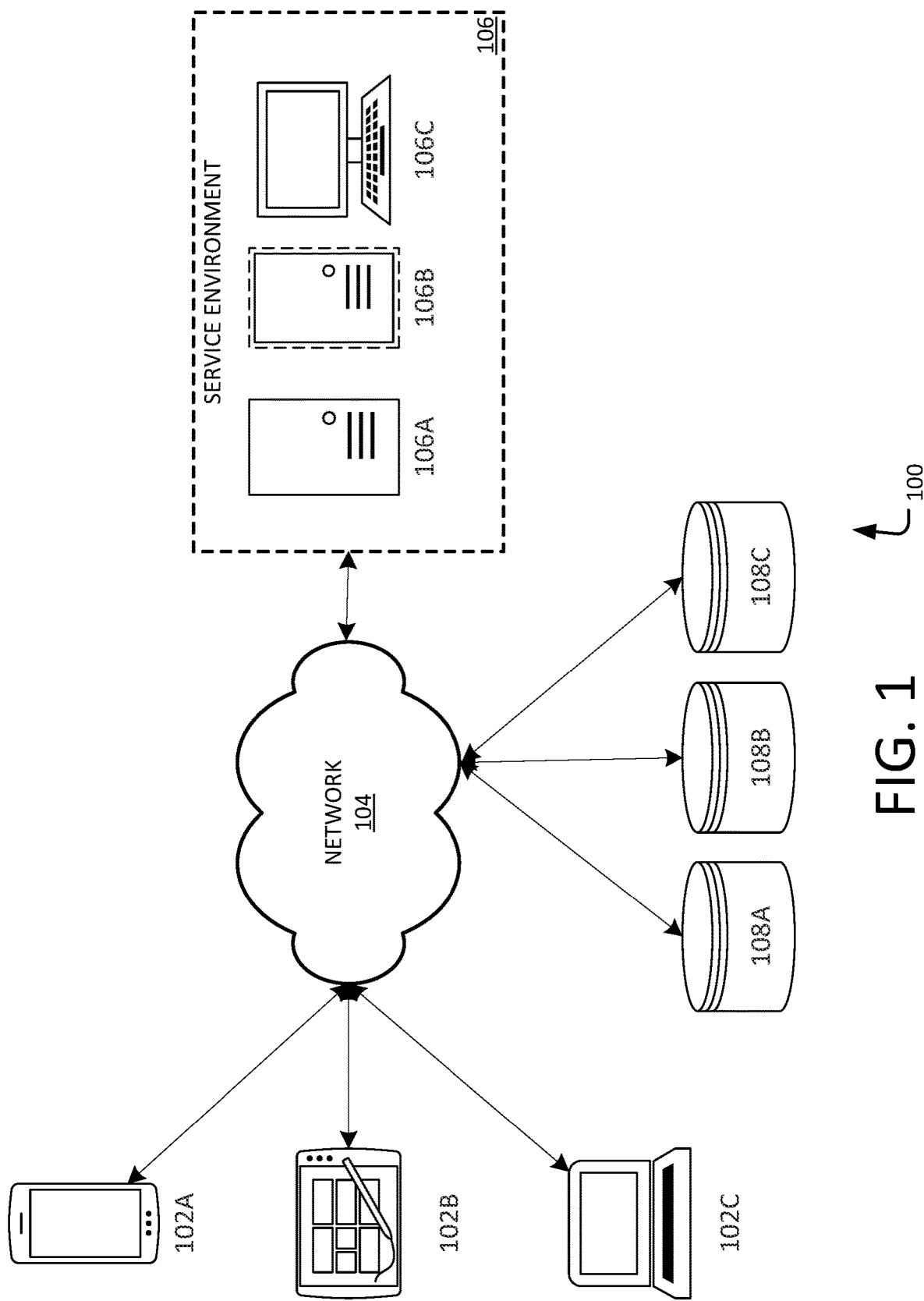
FIG. 1 illustrates an overview of an example system for leveraging interlinking between resources to determine shared knowledge as described herein.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In every organization and group, there are members that have different skills, experience, knowledge sets, and areas of expertise. Although such a diversity of knowledge and experiences may substantially enrich the efficacy, productivity, and culture of the organization or group as a whole, it may also introduce challenges. As one example, members of different groups within an organization often possess different levels of knowledge on various topics. For instance, Engineering team members may have a more technical understanding of a topic, product, or project than Marketing team members. As a result, when members of the different groups discuss certain topics, portions of the discussion may be confusing, incomprehensible, or discussed at the incorrect level of detail. Such scenarios are suboptimal and often lead to inefficiencies in organizational or group resource allocations.

To address the challenges with divergent and/or unknown knowledge sets, the present disclosure describes systems and methods for leveraging interlinking between resources to determine shared knowledge. The systems and methods provide insight into the shared knowledge (or lack thereof) between people, groups, and/or organizations. Such insight is applicable to interactions where the interaction participants are previously acquainted and interactions where the interaction participants are unacquainted. For example, content items that have been associated with interaction participants during a previous interaction may be used to establish a shared topic knowledge level for each of the participants. As another example, content items that are associated with a particular user may be used to contextualize the user in preparation for an initial meeting or interaction.

In aspects of the present disclosure, user interaction with one or more applications or services may be detected. Example user interaction may include, but is not limited to, composing or editing a content item, receiving or sending a content item, navigating a content item or data source, requesting a search operation, etc. A content item, as used herein, may refer to textual, visual, or aural content that may be encountered by a user. Examples of content items includes documents, messages, text, images, sounds, videos, animations, etc. User input associated with the user interaction may be processed to identify information, such as terms, topics, entities (e.g., organizations, groups, individuals), entry points (e.g., applications or services), user data (e.g., user identifier, account identifier, user role/title), user device data (e.g., user device name or type, user device capabilities), and the like. The identified information may be used to search one or more data sources for relationships between the identified information and content items, topics, and/or entities stored by the data sources. The data sources may comprise data relating to various applications or services. Examples of data sources include databases (e.g., relational databases, graph databases), data tables, markup language files, flat files, and the like.

In aspects, the relationships between the identified information and content items, topics, and/or entities stored by the data sources may correspond to explicit linking data and/or implicit linking data. Explicit linking, as used herein, may refer to an act of embedding content from a first content item into a second content item or providing a reference from a first content item to a second content item. Examples of explicit linking include, but are not limited to, including a hyperlink of source content in a destination content item, including an identifier of source content in a destination content item, and embedding content into a destination content item. Explicit linking data may include relationships explicitly defined by a user and/or relationships explicitly referencing a content item. For instance, a user may manually include a hyperlink to a first document within a second document. The hyperlink may be defined in the data source (by a user or a process of the data source) as an explicit link between the first and second document. Implicit linking, as used herein, may refer to an act of including content from a source content item within a destination content item, without a specific reference to the source content item. Examples of implicit linking may include, but are not limited to, copying a portion of a source content item to a destination content item (e.g., copy/paste), inserting source content into a destination content item via a content insert utility (e.g., Insert File function, Insert Image function), including into a destination content item content that is similar to or derived from content in a source content item, and implicitly referencing source content (e.g. "that document," "the March meeting chart"). Implicit linking data may include relationships implicitly defined by the data source or an associated application or service. For instance, a portion of content may be copied from a first document to a second document. The copying action may define an implicit link between the first and second document.

In aspects, the search of the data sources may identify a set of search results. The set of search results may include one or more content items, topics, and/or entities relating to the identified information. Identifying the set of search results may include comparing one or more terms in the identified information to one or more terms or tags associated with the content items in the data sources. In examples, content item tags may indicate topics and concepts included in or relating to a content item. After identifying the set of search results, the set of search results may be evaluated according to one or more criterion or factors to determine a knowledge level of one or more entities with one or more topics. Example criterion/factors include, but are not limited to, semantic similarity between terms in the identified information and terms associated with the content items in the data source, distance or number of content items (e.g., nodes) between a first content item and a second content item in the data source, relationship properties of the content items and/or entities, content item properties, and entity properties. Based on the evaluation of the set of search results, an indication of the identified knowledge level(s) may be provided.

Accordingly, the present disclosure provides a plurality of technical benefits including but not limited to: improving the identification of shared knowledge, identifying data resources linked to entities, providing recommendations for improving content readability and comprehension, tracking and identifying implicitly linked content items, ranking content item importance based on an indication of an entity's knowledge level with the content item or topics covered by the content item, using a graph database to visualize entity knowledge level, identifying biographical information and talking points for new and/or existing user contacts, and enabling entity contextualization, among other examples.

FIG. 1 illustrates an overview of an example system for leveraging interlinking between resources to determine shared knowledge as described herein. Example system 100 as presented is a combination of interdependent components that interact to form an integrated whole. Components of the system may be hardware components or software components implemented on and/or executed by hardware components of the system. In one example, system 100 may provide an operating environment for software components to execute and utilize resources or facilities of system 100. An example of one or more processing devices comprising such an operating environment is depicted in FIGS. 6-9. In another example, the components of systems disclosed herein may be distributed across multiple devices. For instance, input may be entered on a client device and information may be processed or accessed from other devices in a network, such as one or more cloud or remote server devices.

As one example, system 100 comprises computing devices 102A-C, network 104, service environment 106, computing devices 106A-C, and data sources 108A-C. One of skill in the art will appreciate that the scale of systems such as system 100 may vary and may include more or fewer components than those described in FIG. 1. Examples of computing devices 102A-C include, but are not limited to, a personal computer (PC), a mobile device (e.g., smartphone/phone, tablet, laptop, personal digital assistant (PDA)), a wearable device (e.g., smart jewelry, a body-mounted device), or the like. In aspects, computing devices 102A-C may comprise, or have access to, one or more software applications or services. Examples of software applications or services include, but are not limited to, presentation tools, word processing tools, spreadsheet tools, calendar/tasking tools, messaging tools, content discovery/retrieval tools, personal digital assistant tools, etc. The software applications or services may collect input from users using one or more sensor devices. Examples of sensor devices include microphones, touch-based sensors, keyboards, pointing/selection tools, optical/magnetic scanners, accelerometers, magnetometers, gyroscopes, etc. The collected input may include, for example, voice input, touch input, text-based input, gesture input, and/or video/image input. In examples, collection and/or storage of the input may be subject to one or more data privacy protections or criterion. For example, users may be required to "opt-in" or otherwise consent to the collection, storage, and/or evaluation of the input. As another example, users may be permitted to review, edit/redact, and/or selectively restrict access to the collected input. As still another example, the system may anonymize or encrypt personally identifiable information.

In aspects, computing devices 102A-C may provide the collected input to an input processing component. The input processing component may be installed on or accessed locally by computing devices 102A-C. Alternately, the input processing component may be accessed remotely by computing devices 102A-C. For example, computing devices 102A-C may transmit the collected input to an external device or service, such as service environment 106, via network 104. Although service environment 106 is illustrated as external to computing devices 102A-C, it is contemplated that service environment 106 may be provided by, or locally accessible to, computing devices 102A-C. In examples, service environment 106 may comprise computing devices, such as computing devices 106A-C. Examples of computing devices 106A-C include, but are not limited to, a PC, a server device, a cloud computing device, a virtual device, or the like. In at least one example, service environment 106 may additionally or alternately comprise computing devices 102A-C and/or data sources 108A-C.

Upon receiving the collected input, the input processing component may perform processing techniques to identify information (e.g., one or more terms or topics, or entities) in or relating to the collected input. The information may be used to generate one or more search queries. The search queries may be used to search data sources 108A-C for content items, topics, entities, relationship data, and/or property information relating to the collected input. Examples of data sources 108A-C include, but are not limited to, databases, data tables, data files, and similar data structures storing data. Search results identified by the search queries may be evaluated according to one or more criterion to determine a knowledge level of one or more entities with one or more topics. In some examples, the evaluation may include scoring and/or ranking the search results. Aspects of the scoring and/or ranking may be performed by computing devices 102A-C, computing devices 106A-C, data sources 108A-C, or a combination thereof. An indication of the knowledge level(s) may be provided to and/or presented by computing devices 102A-C.

Figure 2:
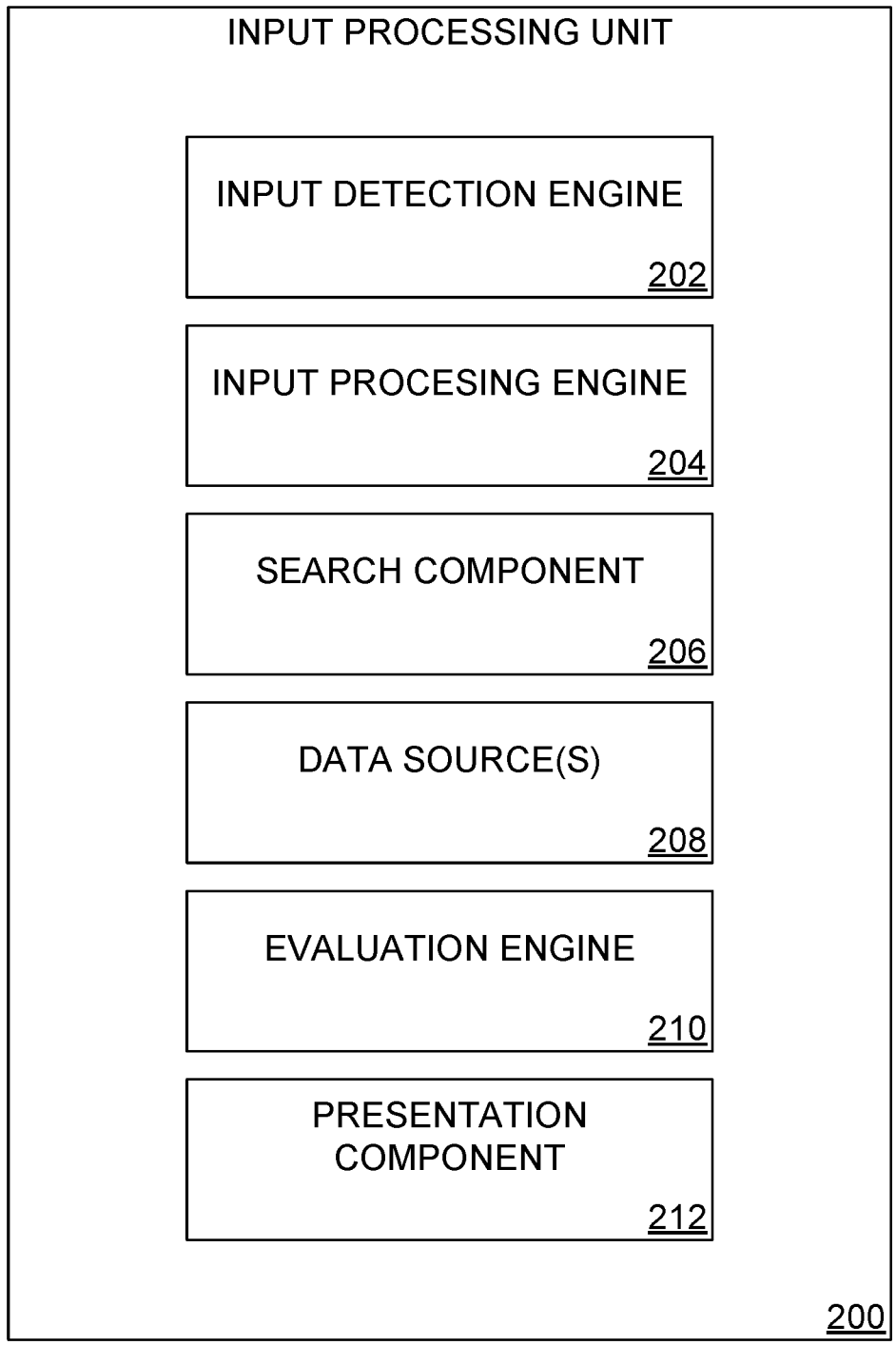
FIG. 2 illustrates an example input processing unit for leveraging interlinking between resources to determine shared knowledge as described herein.

FIG. 2 illustrates an example input processing unit 200 for leveraging interlinking between resources to determine shared knowledge as described herein. The interlinking resource leveraging techniques implemented by input processing unit 200 may comprise the techniques and data described in system 100 of FIG. 1. In some examples, one or more components of input processing unit 200 (or the functionality thereof) may be distributed across multiple devices. In other examples, a single device (comprising at least a processor and/or memory) may comprise the components of input processing unit 200.

In aspects, input processing unit 200 may comprise input detection engine 202, input processing engine 204, search component 206, data source(s) 208, evaluation engine 210, and presentation component 212. One of skill in the art will appreciate that the scale of input processing unit 200 may vary and may include additional or fewer components than those described in FIG. 2. For example, the functionality of query processing engine 206, search component 208, and/or evaluation engine 210 may be combined into a single component, model, or algorithm.

Input detection engine 202 may be configured to receive or detect input for one or more users or devices, such as computing devices 102A-C. The input may include audio data, touch data, text-based data, gesture data, video/image data, etc. Detecting the input may include using one or more background processes to monitor and/or capture user input in real-time. Upon receiving the input, input detection engine 202 may perform one or more pre-processing steps. The pre-processing steps may include, for example, parsing the input into one or more input types (e.g., audio data, video data, text data), identifying user/device identifiers (e.g., user/account name, device name/type), identifying entry point information (e.g., the application or service used to collect the input), identifying date/time information, identifying input attributes (e.g., length of input, subject and/or content of input), storing and/or labeling the input, etc. Input detection engine 202 may provide the input and/or pre-processed data to input processing engine 204.

Input processing engine 204 may be configured to perform one or more post-processing steps. The post-processing steps may include, for example, identifying one or more terms, entities, or topics included in or relating to the input, identifying terms that are synonymous or similar to terms in the input, identifying one or more topics or categories associated with input, modifying the input to include additional or fewer terms, generating search queries and/or subqueries based on the input, identifying data sources comprising data associated with the input, etc. Input processing engine 206 may provide the input and/or the post-processed data to search component 206.

Search component 206 may be configured to search for data using the input and/or the post-processed data. In examples, search component 206 may use the input and/or the post-processed data identify one or more search results (e.g., topics, content items, entities, relationships, associated properties) in one or more data sources, such as data source(s) 208. Data source(s) 208 may be configured to store and provide access to various content, such as user data (e.g., user account files, user profiles, personal information manager (PIM) files), device data (e.g., device identifiers, device capabilities, usage data), application data (e.g., user contact files, email files, calendar files, chat session files, presentation files, word processing files, spreadsheet files), and other electronic documents (e.g., books, magazines, white papers, news articles, blogs). Identifying the search results may include traversing the content and structure of a data source and/or using a pattern matching technique. For example, the various nodes and edges of a data source, such as a graph database, may be traversed to identify content item tags and properties connecting or otherwise related to terms in the input. Search component 206 may provide the search results to evaluation engine 210.

Evaluation engine 210 may be configured to evaluate search results identified using search component 206. Evaluating the search results may include applying one or more criterion or assessing one or more factors. Example criterion/factors include semantic similarity between terms in the input and terms associated with the search results, distance between a first content item and a second content item in a visualization of a data source, number of content items or nodes between a first content item and a second content item in a visualization of a data source, relationship properties of the content items and/or entities in a data source, properties for content items and entities, etc. In some examples, evaluation engine 210 may generate scores or ratings for one or more of the search results. Generating the scores or ratings may include assigning criterion/factor scores and or weighting factors to one or more of the various criterion/factors used to evaluate the search results. The various criterion/factor scores for each search result may be combined to form a search result score. In at least one example, the search result scores may be sorted, ranked, and/or classified. The rankings or classification may indicate a knowledge level of one or more topics. Evaluation engine 210 may provide the evaluated search results to presentation component 212.

Presentation component 212 may be configured to present an indication of an identified knowledge level. In aspects, presentation component 212 may present the indication of an identified knowledge level in the context of the input entry point. As one example, while composing an email message using an email application, input associated with a recipient of the email message (e.g., recipient email address, recipient name) and/or a subject topic may be detected. As a result, an indication of the recipient's identified knowledge level for the subject topic may be presented using an interface and/or interface elements of the email application. As another example, while composing a memo using a word processing application, input associated with a topic in the memo may be detected. As a result, one or more suggestions for improving the readability of the memo and/or providing additional content may be presented using an interface of the word processing application.

Having described various systems that may be employed by the aspects disclosed herein, this disclosure will now describe one or more methods that may be performed by various aspects of the disclosure. In aspects, method 300 may be executed by an execution environment or a system such as system 100 of FIG. 1 or input processing unit 200 of FIG. 2. However, method 300 is not limited to such examples. In other aspects, method 300 may be performed by a single device comprising an application or service. In at least one aspect, method 300 may be executed (e.g., computer-implemented operations) by one or more components of a distributed network, such as a web service/distributed network service (e.g. cloud service).

Figure 3:
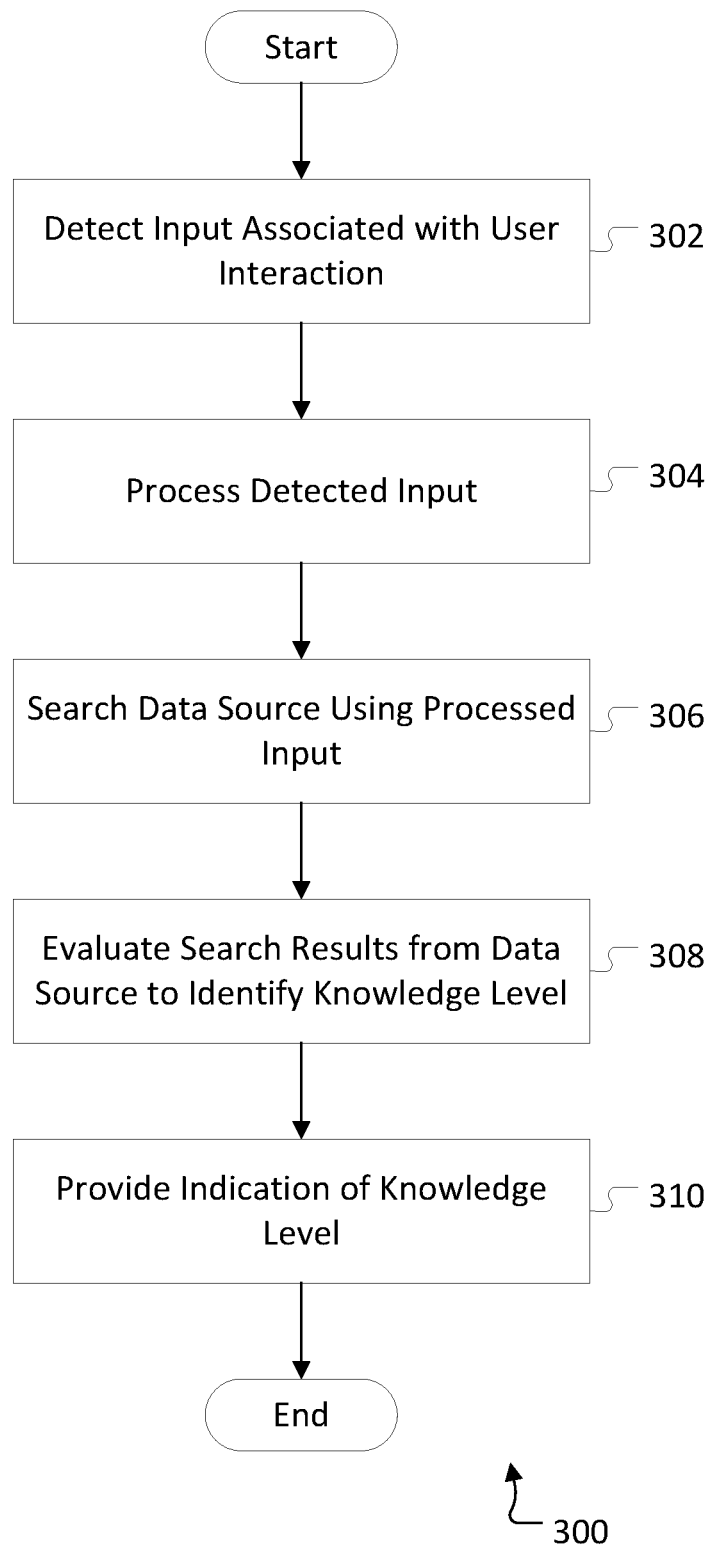
FIG. 3 illustrates an example method for leveraging interlinking between resources to determine shared knowledge as described herein.

FIG. 3 illustrates an example method 300 for leveraging interlinking between resources to determine shared knowledge. Example method 300 begins at operation 302, where input associated with user interaction is detected. In aspects, input may be detected and received in response to user interaction with one or more user devices, such as computing devices 102A-C. The input may be detected in real-time using an input monitoring component of or accessible to the user device, such as input detection engine 202. Alternately, the input may be provided to the user device in one or more data batches during multiple time intervals. The user interaction may correspond to composing or editing a content item, receiving or sending a content item, navigating a content item or data source, requesting a search operation, or the like. As one example, while composing an email message, input associated with one or more message recipients and/or one or more message topics may be detected in real-time.

At operation 304, received input may be processed. In aspects, a processing component, such as input processing engine 204, may perform one or more processing steps on the received input. The processing steps may include, for example, identifying one or more terms, entities, or topics included in or relating to the received input, identifying terms that are synonymous or similar to terms in the received input, identifying one or more topics or categories associated with the received input, modifying the received input (e.g., adding and/or removing terms), generating search queries and/or subqueries based on the received input, identifying data sources comprising data associated with the received input, etc. As one specific example, input associated with an email being composed may be parsed to identify the message recipient "John Smith" and the message topic "Artificial Intelligence." Identifying the message recipient may include evaluating the "To:" header field and the salutation of the message (e.g., "Hello John,"). Identifying the message topic may include evaluating the "Subject" header field (e.g., "Artificial Intelligence Presentation"), the content of the message, and/or content and metadata for one or more attachments to the message. Evaluating the content of the message and attachment(s) may include identifying and normalizing terms in the content of the message (e.g., "A.I.," "machine learning").

Figure 4:
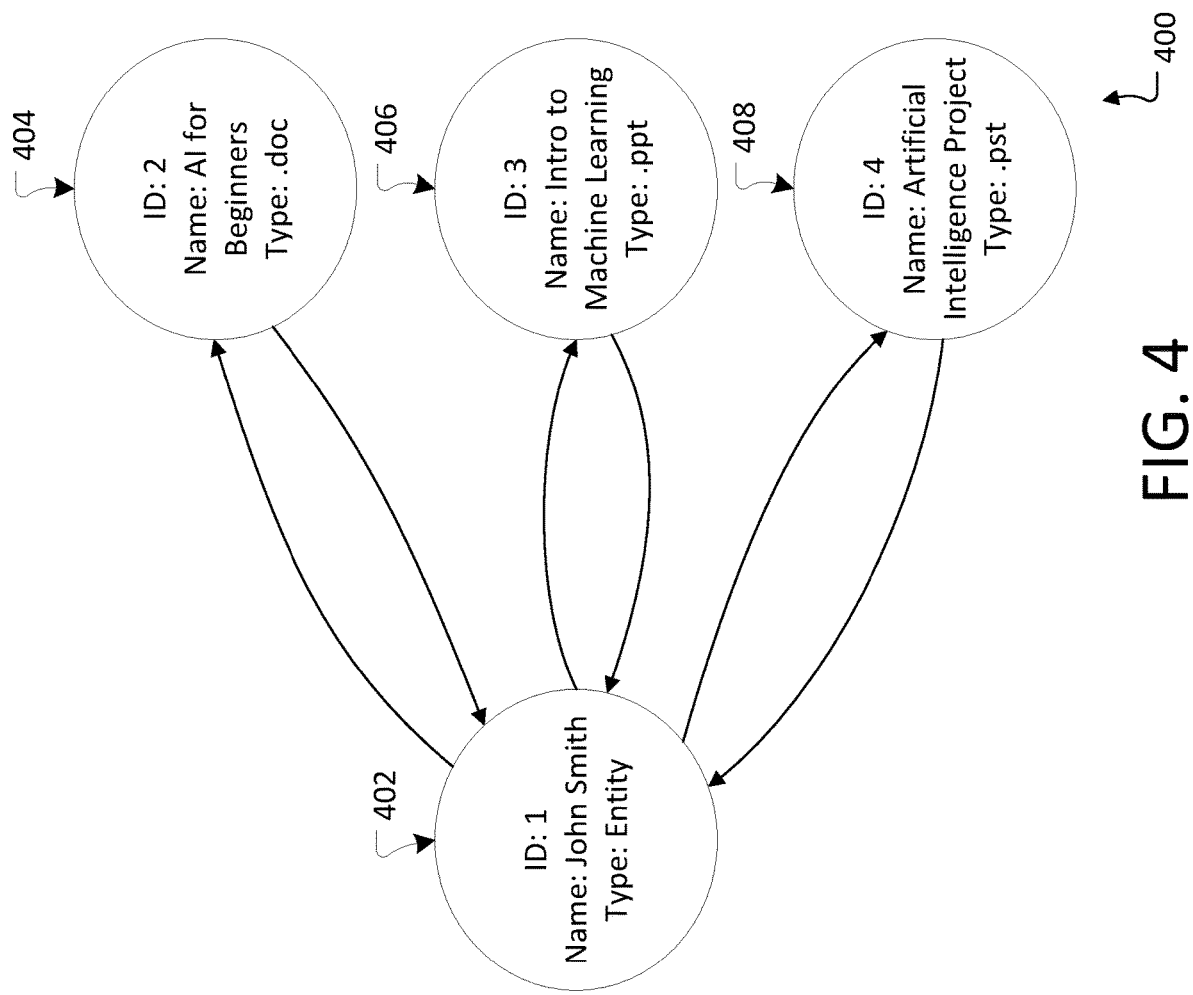
FIG. 4 is an example diagram of interlinked resources for a single entity as described herein.

At operation 306, a data source may be searched. In aspects, the input processed by the processing component ("processed input") may be used to search one or more data sources, such as data sources(s) 208, for topics, content items, entities, relationships, associated properties, etc. identified by the received input. Searching the data source(s) may include using a search utility, such as search component 206, and regular expressions, fuzzy logic, a pattern recognition model/equation, or other search techniques. Upon identifying one or more results, the results may be added to a set of search results. Identifying the search results may include traversing the content and structure of a data source. As one example, FIG. 4 is an example diagram 400 of interlinked resources for a single entity. Diagram 400 comprises nodes 402, 404, 406, and 408. Node 402 represents the entity "John Smith" and is connected to nodes 404, 406, and 408. Node 404 represents the content item "AI for Beginners" document, node 406 represents the content item "Intro to Machine Learning (ML)" presentation, and node 408 represents the content item "Artificial Intelligence Project" email. A search utility may traverse out from node 402 to identify nodes 404, 406, and 408 and/or corresponding relationship information between the nodes. Various pattern matching techniques may be used to determine that the topic "Artificial Intelligence" identified in the received input relates to the nodes 404, 406, and 408. Accordingly, the corresponding document, presentation, and email may be added to a set of search results.

At operation 308, a set of search results may be evaluated. In aspects, an evaluation component, such as evaluation engine 210, may evaluate the set of search results based on one or more criterion and/or factors. Example criterion/factors include semantic similarity between terms in the input and terms associated with the search results (e.g., exact matches may be prioritized over partial matches, acronyms may be prioritized over synonyms), distance between a first content item and a second content item in a visualization of a data source (e.g., close proximity nodes may be prioritized over nodes farther away), number of content items or nodes between a first content item and a second content item in a visualization of a data source (e.g., direct relationships between two nodes may be prioritized over node relationship comprising intervening nodes), relationship properties of the content items and/or entities in a data source (e.g., authoring a document is more indicative of knowledge than viewing a document, viewing a document is more indicative of knowledge than receiving a document), properties for content items (e.g., create/modify dates, authoritativeness, popularity, number of views, number of times referenced, viewer session metrics), properties for entities (e.g., area of expertise, experience, number of publications, awards, educational details, role/title), among others.

In aspects, the evaluation may comprise generating search result scores or ratings for one or more of the search results. The search result scores/ratings for the individual search results may be based on scores, ratings, and/or weighting factors assigned to one or more of the criterion/factors. In examples, one or more scoring techniques may use the scores, ratings, and/or weighting factors to generate a search result score. Example scoring techniques may include scoring algorithms, scoring models, and scoring logic sets. For instance, criterion scores and weighting factors for a search result may be provided as input to a weighted product scoring model. The weighted product scoring model may apply each weighting factor to a corresponding criterion score to generate a weighted criterion score. The weighted criterion scores may be combined (e.g., via multiplication, addition) to generate a search result score. The search result score may represent the knowledge level of one or more users with a corresponding search result. The search result scores may be further weighted and/or combined to generate a total search results score. The total search results score may determine a knowledge level of one or more topics, entities, or content items relating to the received input. For example, referring back to FIG. 4, the evaluation component may determine that John Smith is highly knowledgeable regarding the topic Artificial Intelligence based on the association between node 402 and nodes 404, 406, and 408.

In some aspects, the total search results scores may be compared to one or more threshold values. The threshold values may correspond to various classifications or knowledge levels. For instance, a range of knowledge levels may span from 0 to 5, where 0 indicates no knowledge or minimal knowledge of a search result or topic and 5 indicates intimate knowledge or expert knowledge of a search result or topic. In examples, the threshold value may be predefined as a default value. The default value may be hard-coded into machine code and not user-configurable or may be manually configurable any time during or after detecting the input at operation 302. Alternately, the threshold value may be dynamically derived based on information determined in response to detecting input at operation 302, such as the size or the number of content items/entities in a data source, topic complexity, topic obscurity, user attributes, etc. For instance, a threshold value corresponding to an average knowledge level may be lowered from a default value of 3 to a value of 2 when a topic is identified as obscure or esoteric. The lowered threshold value may indicate that, although the user may not be overly familiar with the topic, the obscurity of the topic may result in the user being considered relatively knowledgeable on the topic compared to other users. The dynamic of evaluation of detected input may enable the threshold values to change over time or in response to changes in entity and/or content item status.

In some aspects, the threshold value may be derived objectively. For instance, the threshold value may represent the average or median knowledge level of a "typical" entity in a population of entities. The average or median knowledge level may be determined by evaluating all of the relationships between topics, content items, and entities in one or more data sources. In other aspects, the threshold value may be based on a single entity or a subset of entities. As one example, the knowledge level of an email message author may be determined using the knowledge determination techniques discussed herein or using alternate techniques. The knowledge level of the email message author may be set as the threshold value for evaluating the knowledge level of the email message recipient. As another example, the knowledge level of one or more email message recipients may be set as the threshold value for evaluating the knowledge level of other recipients of the email message. As yet another example, the knowledge level of a user's peer group, team, or social circle may be set as the threshold value for evaluating the knowledge level of the user.

At operation 310, a determined knowledge level may be provided. In aspects, an output component, such as presentation component 212, may be used to provide an indication of a determined knowledge level with one or more topics, entities, or content items. In some examples, the indication may be provided in a context relevant to an entry point associated with the received input. For example, while drafting an email, the email application may provide a real-time indication of each recipient's knowledge level of a particular topic or a document associated with the email. The email application may also display previous communications between the message author and the recipient(s), relevant content from other applications and services external to the email application, and relevant content from platforms and frameworks relating to the email application. For instance, the email application may display emails previously sent/received using the email application, portions of a conversation from a texting application, documents from a word processing application, voicemails from a voicemail service, and components of a content item that may be composed and/or stored independently from the content item.

In other examples, the indication of a determined knowledge level may be provided in a context independent from an entry associated with the received input. For instance, while interacting with a chat application, an indication of a chat participant's knowledge level of a topic or content item may be presented by an alternate entry point other than the chat application, such as a digital assistant or an applications or services hub. Additionally, entities associated with the topic or content item and the relevant knowledge levels of the entities may be identified and presented by the alternate entry point or a separate entry point. In at least one example, contextual information may be provided for entities determined to be unknown to the user or with which the user has not previously communicated. The contextual information may comprise, for example, a brief bio of an entity, suggested talking points, content items viewed or authored by an entity, social circle or peer group members of an entity, or other introductory information.

In yet other example, the output component may provide real-time recommendations to improve readability, comprehension, and/or conciseness of a content item. For instance, as a user composes a document using a word processing application, the word processing application may recommend explaining a concept in more or less detail, providing additional or less content, spelling out or using more acronyms, linking background or helpful documents, modifying a list of currently linked documents or attachments, etc. As yet another example, while navigating (e.g., viewing, listening to, scrolling through) web content, a web browsing application (or a component associated therewith) may provide an indication of user contacts relating to the web content or to topics therein, or provide recommendations of content items relating to the web content. For instance, the web browsing application may recommend entities known to or related to the navigating user and/or provide indications of an entity's knowledge of the web content or topics associated therewith.

Figure 5:
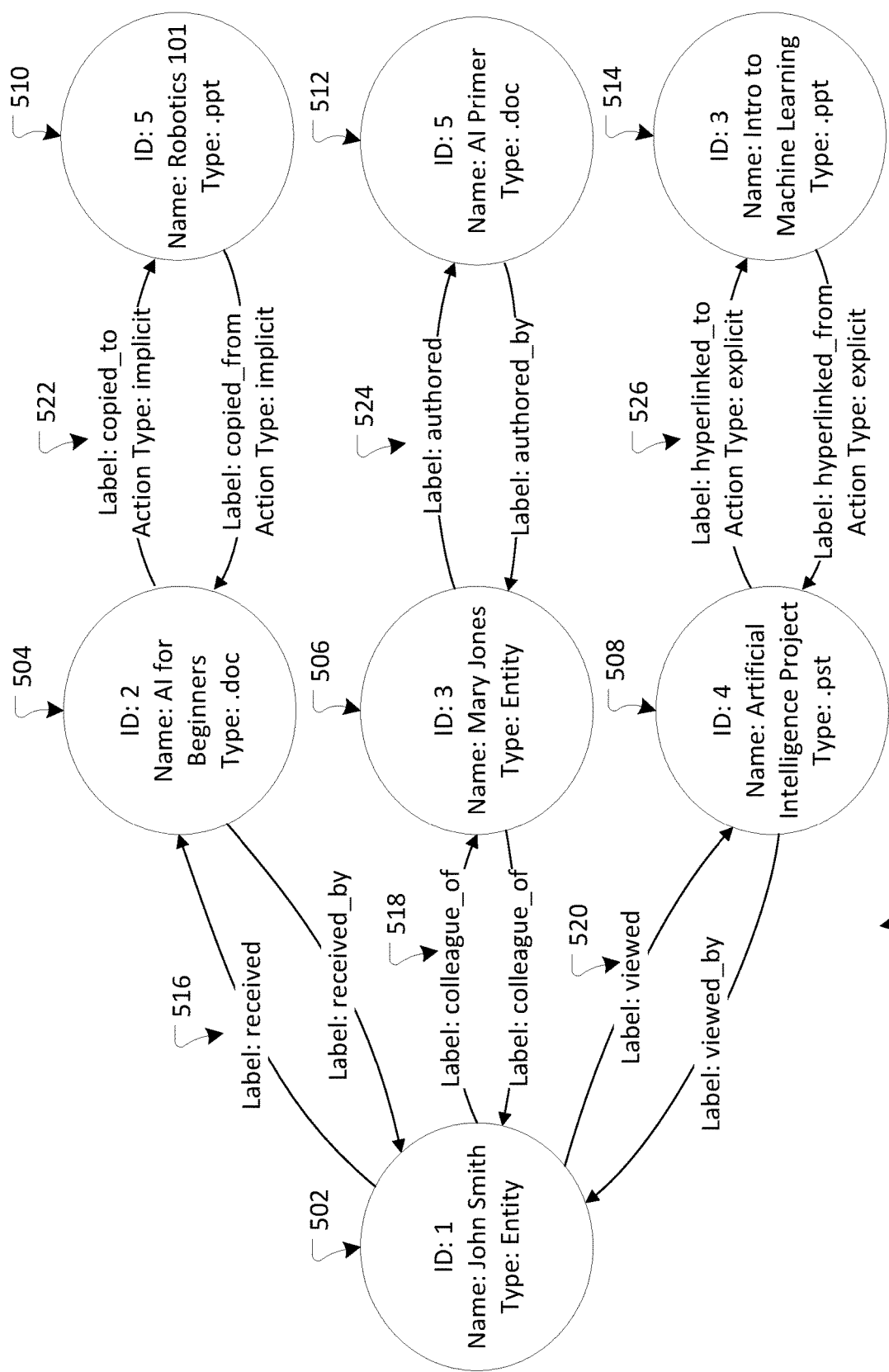
FIG. 5 is an example diagram of interlinked resources for multiple entities as described herein.

FIG. 5 illustrates an example diagram 500 of interlinked resources for multiple entities. Diagram 500 comprises nodes 502, 504, 506, 508, 510, 512, and 514 and relationship pairs 516, 518, 520, 522, 524, and 526. Nodes 502 and 506 represent the entities "John Smith" and "Mary Jones," respectively. Nodes 504, 508, 510, and 512 each represent a different content item. Relationship pairs 516, 518, 520, 522, 524, and 526 define the various relationships between the entities, the content items, and the entities and the content items. As discussed with respect to FIG. 2, an evaluation component may evaluate the content of diagram 500 to generate one or more scores and/or to provide an indication a knowledge level of one or more topics.

As one example, with respect to node 502 and the topic "Artificial Intelligence," the evaluation component may determine that the Name attributes for nodes 504, 508, and 512 are sufficiently similar to the terms "Artificial Intelligence." Accordingly, nodes 504, 508, and 512 may be scored such that node 508 receives the highest score for comprising the topic terms (where terms that are exact match with terms in the identified topic are assigned a large weighting factor), node 504 receives the second highest score for comprising the synonymous topic term "AI" and for proximity to node 502 (where terms that are synonymous with terms in the identified topic are assigned a moderate weighting factor and nodes are assigned weighting factors based on proximity to another node), and node 515 receives the third highest score for comprising the synonymous topic term "AI" and relative distance to node 502. The scores for the three content items corresponding to nodes 504, 508, and 512 may be combined using a scoring algorithm or model to generate a combined score for node 502. The combined score may be compared to one or more thresholds or evaluated against knowledge classification logic. For example, a set of threshold may be configured such that a score below 3 is considered beginner knowledge, a score between 3 and 7 is considered intermediate knowledge, and a score above 7 is considered expert knowledge.

As another example, the evaluation component may evaluate the relationship pairs between node 502 and nodes 504, 508, 510, and 514 and determine that the relationship pair 'viewed/viewed_by' is more important than 'received/received_by,' the Action Type 'explicit' is more important than 'implicit,' and nodes that are displayed as closer are more important. Accordingly, nodes 504, 508, 510, and 514 may be scored such that node 508 receives the highest weighting value and/or score, node 504 receives the second highest weighting value and/or score, node 514 receives the third highest weighting value and/or score, and node 510 receives the fourth highest weighting value and/or score.

As yet another example, the evaluation component may determine that Mary Jones (represented by node 506) is an expert on AI based on relationship pair 524 (indicating authorship of the content item of node 512). Further, evaluation component may determine that John Smith (represented by node 502) is highly knowledgeable regarding AI due to relationship pair 518 (indicating John Smith is a colleague of Mary Jones). Accordingly, node 512 may receive a higher weighting value and/or score than nodes 504, 508, 510, and 514 despite a lack of proximity between node 512 and 502. Although specific example are provided herein, it should be understood that alternate examples are contemplated.

FIGS. 6-9 and the associated descriptions provide a discussion of a variety of operating environments in which aspects of the disclosure may be practiced. However, the devices and systems illustrated and discussed with respect to FIGS. 6-9 are for purposes of example and illustration and are not limiting of a vast number of computing device configurations that may be utilized for practicing aspects of the disclosure, described herein.

Figure 6:
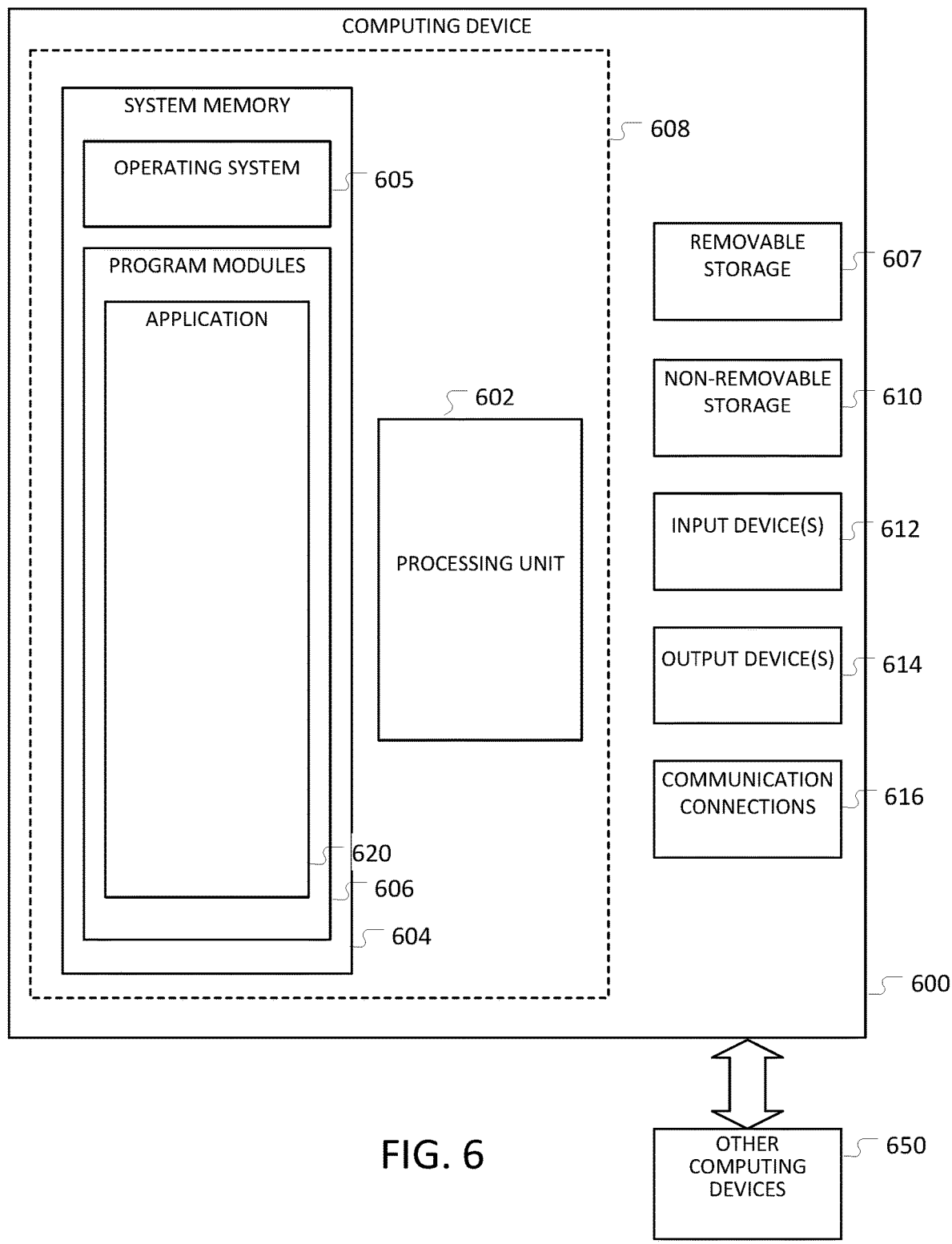
FIG. 6 is a block diagram illustrating example physical components of a computing device with which aspects of the disclosure may be practiced.

FIG. 6 is a block diagram illustrating physical components (e.g., hardware) of a computing device 600 with which aspects of the disclosure may be practiced. The computing device components described below may be suitable for the computing devices and systems described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories.

The system memory 604 may include an operating system 605 and one or more program modules 606 suitable for running software application 620, such as one or more components supported by the systems described herein. The operating system 605, for example, may be suitable for controlling the operation of the computing device 600.

Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., application 620) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
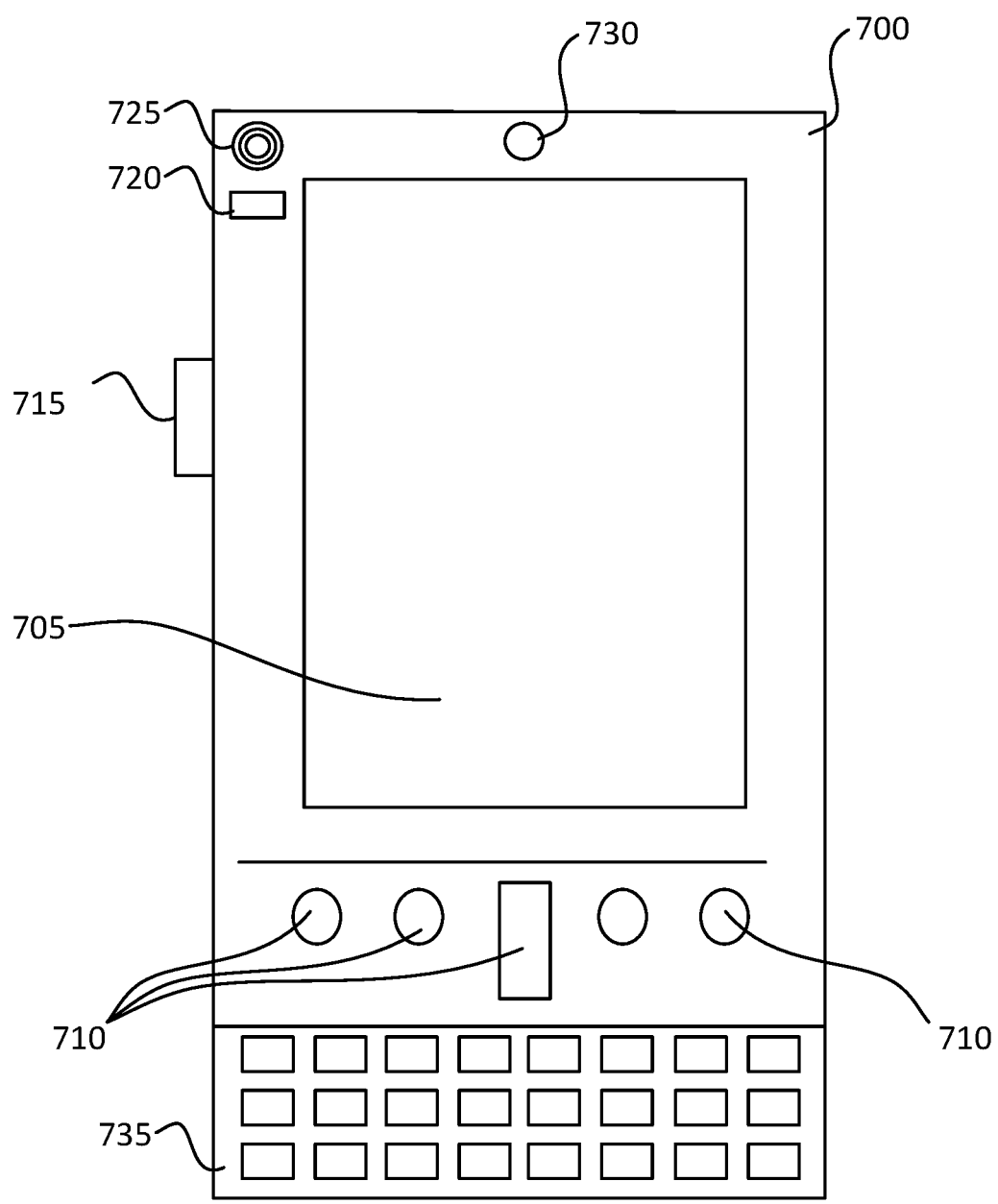
FIGS. 7A and 7B are simplified block diagrams of a mobile computing device with which aspects of the present disclosure may be practiced.
Figure 7B:
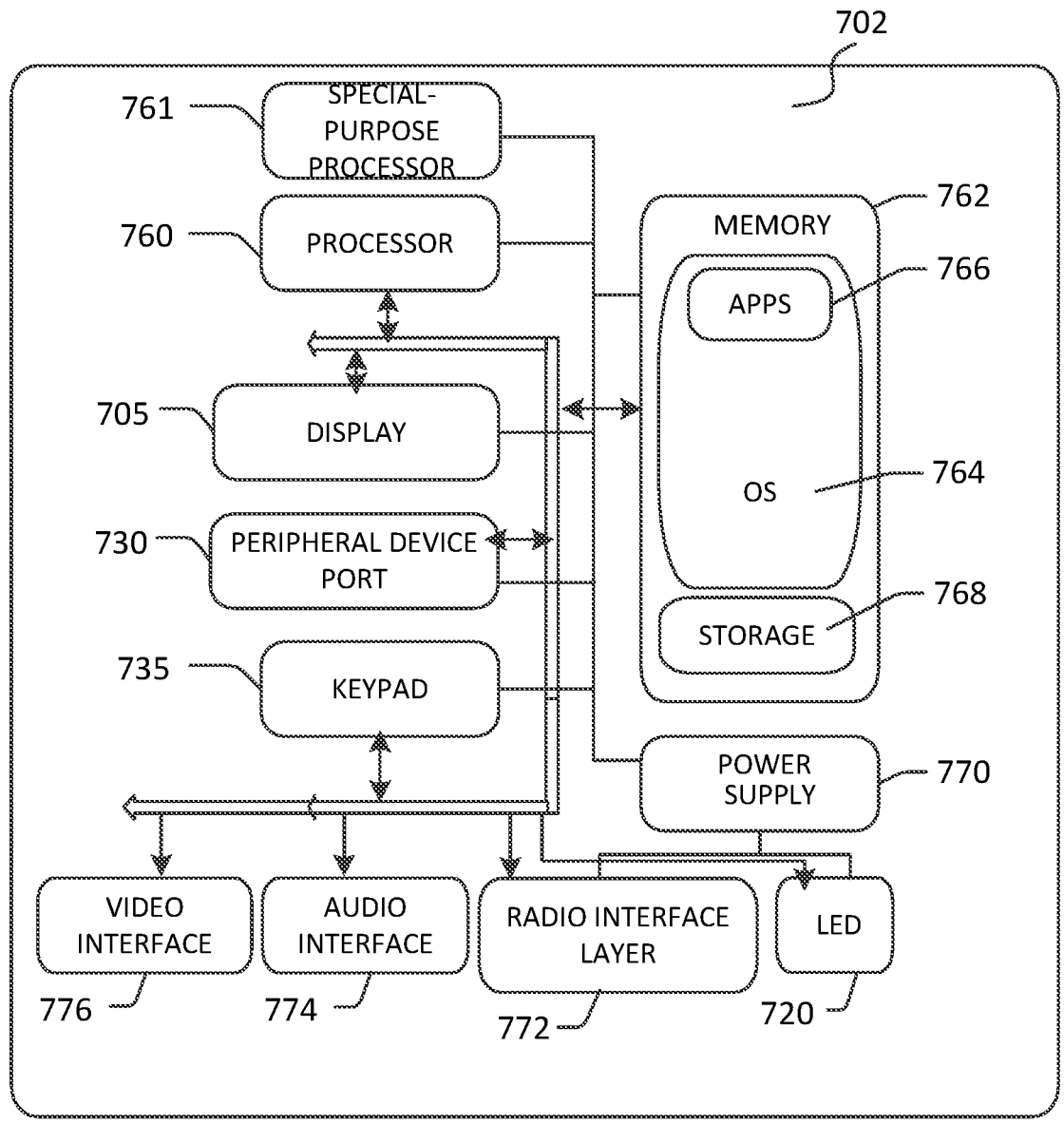

FIGS. 7A and 7B illustrate a mobile computing device 700, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display).

If included, an optional side input element 715 allows further user input. The side input element 715 may be a rotary switch, a button, or any other type of manual input element. In alternative aspects, mobile computing device 700 may incorporate more or less input elements. For example, the display 705 may not be a touch screen in some embodiments.

In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display.

In various embodiments, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700 described herein (e.g., search engine, extractor module, relevancy ranking module, answer scoring module).

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 may be used to provide visual notifications, and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor(s) (e.g., processor 760 and/or special-purpose processor 761) and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
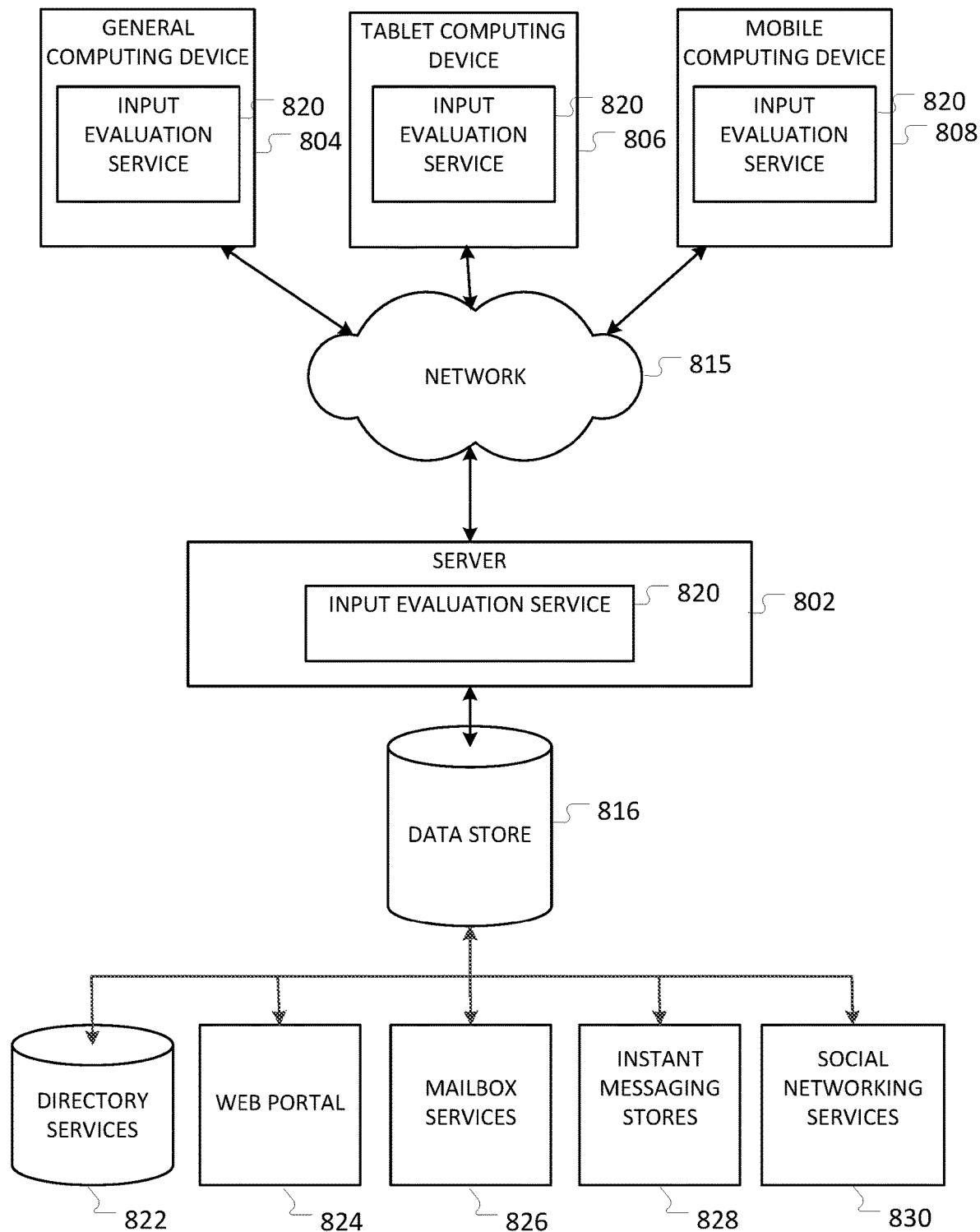
FIG. 8 is a simplified block diagram of a distributed computing system in which aspects of the present disclosure may be practiced.

FIG. 8 illustrates one aspect of the architecture of a system for processing data received at a computing system from a remote source, such as a personal computer 804, tablet computing device 806, or mobile computing device 808, as described above. Content displayed at server device 802 may be stored in different communication channels or other storage types. For example, various documents may be stored using a directory service 822, a web portal 824, a mailbox service 826, an instant messaging store 828, or a social networking site 830.

An input evaluation service 820 may be employed by a client that communicates with server device 802, and/or input evaluation service 820 may be employed by server device 802. The server device 802 may provide data to and from a client computing device such as a personal computer 804, a tablet computing device 806 and/or a mobile computing device 808 (e.g., a smart phone) through a network 815. By way of example, the computer system described above may be embodied in a personal computer 804, a tablet computing device 806 and/or a mobile computing device 808 (e.g., a smart phone). Any of these embodiments of the computing devices may obtain content from the store 816, in addition to receiving graphical data useable to be either pre-processed at a graphic-originating system, or post-processed at a receiving computing system.

Figure 9:
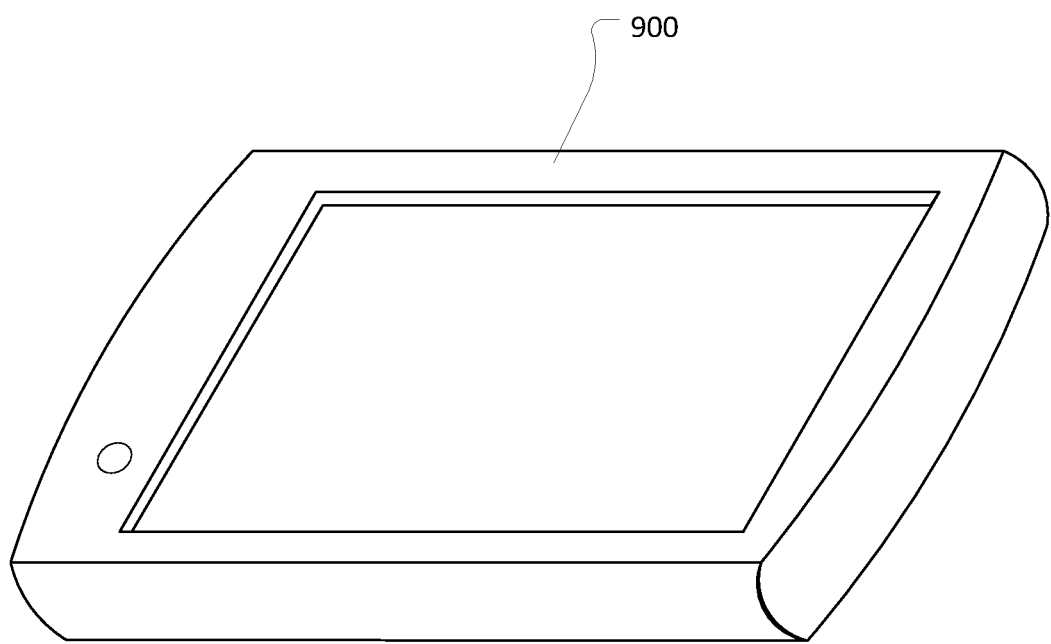
FIG. 9 illustrates a tablet computing device for executing one or more aspects of the present disclosure.

FIG. 9 illustrates an exemplary tablet computing device 900 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processor; and
memory coupled to the processor, the memory comprising computer executable instructions that, when executed by the processor, performs a method comprising:
detecting input from a first user of a messaging application in response to composition of a communication, the input comprising one or more topics and identifying a second user as an intended recipient of the communication;
identifying search results associated with the one or more topics and the second user, wherein identifying the search results comprises:
searching a data source for one or more entries corresponding to the second user;
identifying, in the data source, content items each having a relationship with the one or more entries for the second user and being associated with the one or more topics; and
providing the content items as the search results;
generating content item scores for the content items in the search results based on the relationship between each of the content items and the one or more entries for the second user, wherein each content item score represents a level of expertise of the second user with a content item or with the one or more topics;
determining a knowledge level of the second user with the one or more topics based on the content item scores, wherein determining the knowledge level comprises dynamically deriving a threshold value for content item scores of the content items based on at least one of:
a number of content items related to the one or more topics and stored in a data source;
a complexity of the one or more topics; or
an obscurity of the one or more topics; and
providing an indication of the determined knowledge level of the second user with the one or more topics.

2. The system of claim 1, wherein the input is detected in real-time; and
wherein the user interaction corresponds to at least one of:
composing a content item;
editing a content item;
sending a message; or
receiving a message.

3. The system of claim 1, wherein processing the input further comprises identifying the one or more topics based on the one or more terms.

4. The system of claim 1, wherein the search results further comprise relationship data identifying at least one of:
relationships between the entity and the content items;
relationships between the entity and the one or more topics; or
relationships between the content items and the one or more topics.

5. The system of claim 1, wherein determining the knowledge level comprises at least one of:
determining a semantic similarity between the one or more terms and terms associated with the content items;
determining a distance between a first node and a second in the data source, wherein the first node represents a first content item of the content items and the second node represents a second content item of the content items; or
determining a number of nodes between a first node and a second node in the data source, wherein the first node represents a first content item of the content items and the second node represents a second content item of the content items.

6. The system of claim 1, wherein determining the knowledge level comprises determining relationship rankings of relationships between the content items and the entity.

7. The system of claim 6, wherein at least one of the relationships is an implicit relationship between a content item and the entity.

8. The system of claim 7, wherein the implicit relationship corresponds to at least one of:
a copy/paste action;
a cut/paste action; or
providing a reference from a first content item to a second content item.

9. The system of claim 1, wherein determining the knowledge level comprises determining properties of the content items, wherein the properties of the content items comprise at least one of:
creation or modification date of a content item;
authoritativeness of a content item; or
popularity of a content item.

10. The system of claim 1, wherein determining the knowledge level comprises determining properties of the entity, wherein the properties of the entity comprise at least one of:
area of expertise of the entity;
experience of the entity; or
role or tile of the entity.

11. The system of claim 1, wherein the content item score for one or more of the content items is used to generate a topic score, wherein the topic score represents knowledge of the entity with the one or more topics.

12. The system of claim 1, wherein the user interaction is associated with an entry point; and
wherein the indication of the determined knowledge level is provided in the context of the entry point.

13. The system of claim 1, wherein providing the indication of the determined knowledge level comprises providing at least one of:
a recommendation for improving comprehension of a content item associated with the user interaction; or
a link to additional content items relating to the one or more topics.

14. The system of claim 1, wherein providing the indication of the determined knowledge level comprises graphically presenting to a user a knowledge score or a knowledge classification.

15. The system of claim 1, wherein the indication of the determined knowledge level of the second user is provided to the first user in the context of the messaging application.

16. The system of claim 1, wherein identifying the second user as the intended recipient of the communication comprises evaluating at least one of a recipient header field of the communication or a salutation of the communication.

17. The system of claim 1, wherein the one or more topics in the input are identified by evaluating at least one of a subject header field of the communication or a body portion of the communication.

18. A method comprising:
    detecting, by a user device, user interaction with a web browsing application of the user device during a browsing session of a user;
    processing the user interaction to identify one or more topics;
    searching a data source using the one or more topics to identify an entity associated with the one or more topics;
    generating an entity score for the entity, the entity score representing knowledge of the entity with the one or more topics based on one or more content items that are associated with the entity and the one or more topics in the data source;
    determining a knowledge level of the entity with the one or more topics based on the entity score level of expertise, wherein determining the knowledge level comprises dynamically deriving a threshold value for content item scores of the content items based on at least one of:
        a number of content items related to the one or more topics and stored in a data source;
        a complexity of the one or more topics; or
        an obscurity of the one or more topics; and
    providing an identifier of the entity and the knowledge level of the entity to the user via the browsing application.

19. A computer-readable storage device storing computer executable instructions that when executed cause a computing system to perform a method comprising:
    detecting input from a first user of a messaging application in response to composition of a communication, the input comprising one or more topics and identifying a plurality of users as intended recipients of the communication;
    identifying search results associated with the one or more topics and at least one user of the plurality of users, wherein identifying the search results comprises:
        searching a data source for one or more entries corresponding to the at least one user;
        identifying, in the data source, content items each having a relationship with the one or more entries for the at least one user and being associated with the one or more topics; and
        providing the content items as the search results;
    generating content item scores for the content items in the search results based on the relationship between each of the content items and the one or more entries for the at least one user, wherein each content item score represents a level of expertise of the at least one user with a content item or with the one or more topics;
    determining a knowledge level of the at least one user with the one or more topics based on the content item scores, wherein determining the knowledge level comprises:
        determining rankings of relationships between the at least one user and the content items, at least one of the relationships being an implicit relationship between the at least one user and a content item of the content items; and
        dynamically deriving a threshold value for content item scores of the content items based on at least one of:
            a number of content items related to the one or more topics and stored in a data source;
            a complexity of the one or more topics; or
            an obscurity of the one or more topics
    providing an indication of the determined knowledge level of the at least one user with the one or more topics in a context of the messaging application, wherein the indication comprises the content item score or a text label indicative of the determined knowledge level.

20. The computer-readable storage device of claim 19, wherein the one or more topics in the input are identified by evaluating at least one of a subject header field of the communication or a body portion of the communication.

* * * * *